(12) United States Patent
Sarraf

(10) Patent No.: US 7,542,736 B2  
(45) Date of Patent: Jun. 2, 2009

(54) TECHNIQUES TO DECREASE SIGNAL AMPLITUDE PEAK-TO-AVERAGE RATIO IN A WIRELESS COMMUNICATIONS SYSTEM

(75) Inventor: Mohsen Sarraf, Rumson, NJ (US)

(73) Assignee: M/A-Com, Inc., Lowell, MA (US)

( * ) Notice: Subject to any disclaimer, the term of this patent is extended or adjusted under 35 U.S.C. 154(b) by 497 days.

(21) Appl. No.: 11/189,210

(22) Filed: Jul. 26, 2005

(65) Prior Publication Data

US 2007/0026820 A1   Feb. 1, 2007

(51) Int. Cl.
*H04B 1/04* (2006.01)

(52) U.S. Cl. .................... 455/114.2; 455/114.3

(58) Field of Classification Search .............. 455/114.2, 455/114.3
See application file for complete search history.

(56) References Cited

U.S. PATENT DOCUMENTS

| | | | |
|---|---|---|---|
| 4,584,541 A | | 4/1986 | Nossen |
| 5,418,818 A | | 5/1995 | Marchetto et al. |
| 5,490,172 A | | 2/1996 | Komara |
| 5,524,286 A | | 6/1996 | Chiesa et al. |
| 5,812,607 A | | 9/1998 | Hutchinson, IV et al. |
| 5,929,938 A | * | 7/1999 | Cho ............................ 348/665 |
| 6,294,956 B1 | * | 9/2001 | Ghanadan et al. ........ 330/124 R |
| 6,389,078 B1 | | 5/2002 | Hessel et al. |
| 6,653,909 B2 | | 11/2003 | Nielsen |
| 7,295,816 B2 | * | 11/2007 | McCallister .............. 455/114.2 |
| 2002/0101936 A1 | | 8/2002 | Wright et al. |
| 2003/0002594 A1 | * | 1/2003 | Harel et al. .................. 375/299 |
| 2003/0016762 A1 | | 1/2003 | Martin et al. |
| 2003/0031268 A1 | | 2/2003 | Wight |
| 2003/0064737 A1 | * | 4/2003 | Eriksson et al. .............. 455/501 |
| 2003/0083583 A1 | * | 5/2003 | Kovtun et al. ................ 600/509 |
| 2004/0192229 A1 | | 9/2004 | Morris et al. |
| 2004/0218689 A1 | * | 11/2004 | Akhtman ..................... 375/296 |
| 2005/0129140 A1 | | 6/2005 | Robinson |
| 2006/0053187 A1 | * | 3/2006 | Wagner ....................... 708/300 |
| 2007/0241806 A1 | * | 10/2007 | Pedersen et al. ............ 327/335 |

FOREIGN PATENT DOCUMENTS

WO        WO 98/18217        4/1998

* cited by examiner

*Primary Examiner*—Duc M Nguyen

(57) ABSTRACT

Techniques to reduce signal amplitude peak-to-average ratio (PAR) in a wireless communications system are described. The apparatus may include a signal conditioning module to receive a baseband signal. The signal conditioning module may split the baseband signal along multiple paths, delay one or more of the paths, and combine the multiple paths to form a conditioned signal having lower signal amplitude PAR than the baseband signal. Other embodiments are described and claimed.

22 Claims, 8 Drawing Sheets

TECHNIQUES TO DECREASE SIGNAL AMPLITUDE PEAK-TO-AVERAGE RATIO IN A WIRELESS COMMUNICATIONS SYSTEM

BACKGROUND

In a wireless communications system, such as a code division multiple access (CDMA) system, signals suffering from a high peak-to-average ratio (PAR) can cause inefficiencies in the digital-to-analog (D/A) conversion and in the power amplifier (PA) stages of transmission. In many cases, signals may be clipped beyond a preset threshold so that high PAR signal envelopes are bounded and D/A converter bit-widths are kept in check. In some cases further filtering may be performed on clipped signals before transmission, adding to the complexity of the communications system.

In general, clipping achieves higher PA efficiency at the expense of spurious out-of-band emissions. That is, extra spurious signal energy is emitted out of the bandwidth originally assigned to the signal. This will have adverse effects in most communications systems as the spurious signal energy has gone out of an intended band into neighboring bands. There is also a limit as to how much of the signal can be clipped. Namely, clipping the signal more results in higher PA efficiency at the expense of more out-of-band emissions. Moreover, while clipping may limit a signal to preferred levels, the signal is permanently deteriorated.

SUMMARY

One exemplary embodiment includes an apparatus comprising a signal conditioning module to receive a baseband signal. The signal conditioning module may comprise multiple paths for splitting the baseband signal. The signal conditioning module may include a delay block for delaying one or more of the multiple paths. The signal conditioning module may include a combiner block to combine the multiple paths to form a conditioned signal having a lower signal amplitude peak-to-average ratio than the baseband signal. Other embodiments are described and claimed.

DETAILED DESCRIPTION

Figure 1:
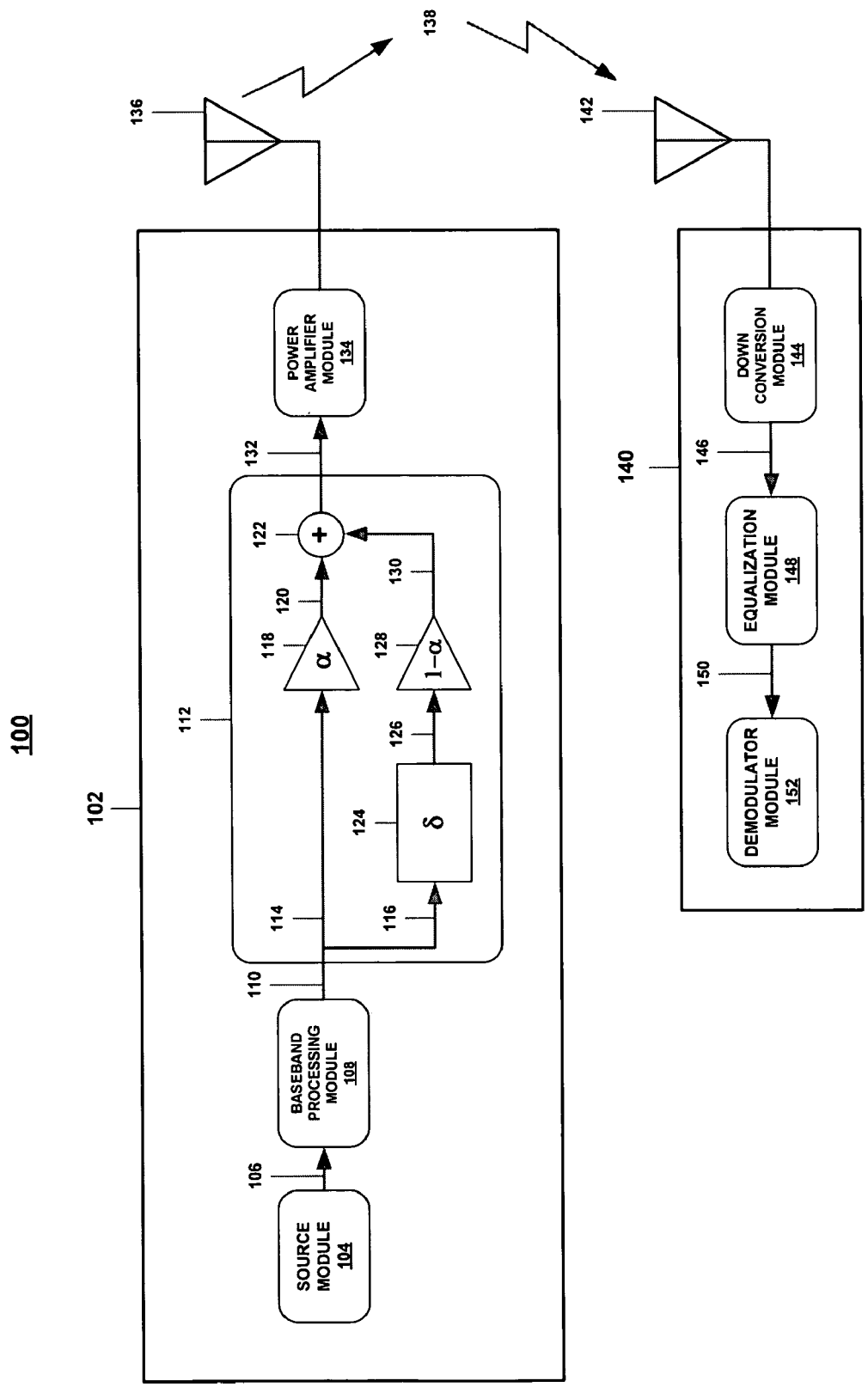
FIG. 1 illustrates a block diagram of a communications system in accordance with one embodiment.

FIG. 1 illustrates a block diagram of a communications system 100 in accordance with one embodiment. In various embodiments, the communications system 100 may comprise multiple nodes. A node generally may comprise any physical or logical entity for communicating information in the system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, a node may comprise, or be implemented as, a computer system, a computer sub-system, a computer, an appliance, a workstation, a terminal, a server, a personal computer (PC), a laptop, an ultra-laptop, a hand-held computer, a personal digital assistant (PDA), a set top box (STB), a telephone, a mobile telephone, a cellular telephone, a handset, a wireless access point, a base station, a radio network controller (RNC), a mobile subscriber center (MSC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth.

The nodes of the communications system 100 may be arranged to communicate one or more types of information, such as voice information, audio information, textual information, numerical information, image information, video information, alphanumeric symbols, character symbols, and so forth. The information also may include data representing commands, instructions or control words meant for an automated system.

The communications system 100 may be implemented as a wireless system arranged to communicate information over one or more types of wireless communication media. An example of a wireless communication media may include portions of a wireless spectrum, such as the radio-frequency (RF) spectrum. In such implementations, the nodes of the system 100 may include components and interfaces suitable for communicating information signals over the designated wireless spectrum, such as one or more antennas, transmitters, receivers, transmitters/receivers ("transceivers"), amplifiers, filters, control logic, and so forth.

The communications system 100 may comprise or form part of a network, such as a Code Division Multiple Access (CDMA) network, a cdma2000 network, a Wide-band CDMA (WCDMA) network, a Time Division Synchronous CDMA (TD-SCDMA) network, a Time Division Multiple Access (TDMA) network, an Extended-TDMA (E-TDMA) network, a Global System for Mobile Communications (GSM) network, an Orthogonal Frequency Division Multiplexing (OFDM) network, a North American Digital Cellular (NADC) network, a Universal Mobile Telephone System (UMTS) network, a third generation (3 G) network, a fourth generation (4 G) network, a wireless personal area network (WPAN), a wireless local area network (WLAN), a wireless metropolitan are network (WMAN), a wireless wide area network (WWAN), the Internet, the World Wide Web, a cellular network, a radio network, a satellite network, and/or any other communications network configured to carry data.

In various embodiments, the communications system 100 may comprise multiple modules and/or blocks connected by one or more communications media. Communications media generally may comprise any medium capable of carrying information signals. For example, communications media may comprise wired communications media, wireless communications media, or a combination of both, as desired for a given implementation. Examples of wired communications media may include a wire, cable, printed circuit board (PCB), backplane, semiconductor material, twisted-pair wire, coaxial cable, fiber optics, and so forth.

The modules and/or blocks may comprise, or be implemented as, one or more systems, sub-systems, devices, components, circuits, logic, programs, or any combination thereof, as desired for a given set of design or performance constraints. Although certain modules and/or blocks may be described by way of example, it can be appreciated that a greater or lesser number of modules and/or blocks may be used and still fall within the scope of the embodiments.

In various embodiments, the communications system 100 may comprise a wireless system arranged to decrease signal amplitude PAR. The described embodiments may be implemented in the communications system 100 by a wireless device such as a transmitter or a transceiver for example. The communications system 100 may condition a baseband signal to decrease signal amplitude PAR without suffering extra spurious out-of-band emission. In various implementations, the communications system 100 may be arranged to decrease signal amplitude PAR by delaying and adding a portion of a baseband signal to itself. In such implementations, clipping the baseband signal may be avoided, and the signal level may be bounded with less damage to signal integrity. The embodiments are not limited in this context.

As shown in FIG. 1, the communications system 100 may comprise a transmitter node 102 including a source module 104 arranged to provide an input data flow 106 to a baseband processing module 108. In various embodiments, the input data flow 106 may comprise a bit stream and/or a serial multilevel data stream of data corresponding to voice, data, and/or video signals.

The baseband processing module 108 may be arranged to receive the input data flow 106 and generate a baseband signal 110. In various implementations, the baseband signal 110 may comprise a CDMA signal (e.g., Direct Spread CDMA, CDMA-One, cdma2000, WCDMA, TD-SCDMA, and/or other variant). It can be appreciated that the baseband signal 110 may comprise other signal types such a TDMA signal, a GSM signal, an OFDM signal, a Quadrature Amplitude Modulation (QAM) signal, a single carrier signal, a multi-carrier signal, a single tone signal, and/or a multi-tone signal, for example.

In various embodiments, the baseband processing module 108 may comprise a modulator such as a single-channel or multi-channel I/Q modulator, for example. The modulator may be arranged to employ various modulation techniques such as, for example: QAM, Differential QAM (DQAM), Binary Phase Shift Keying (BPSK) modulation, Quadrature Phase Shift Keying (QPSK) modulation, Offset QPSK (OQPSK) modulation, Differential QPSK (DQPSK), Frequency Shift Keying (FSK) modulation, Minimum Shift Keying (MSK) modulation, Gaussian MSK (GMSK) modulation, and so forth.

In various embodiments, the baseband processing module 108 may comprise a carrier generator such as a digital synthesizer, for example. The carrier generator may be arranged to generate an RF carrier signal. The baseband processing module 108 also may comprise a code generator to generate a code signal for modulating the RF carrier signal. The code signal may comprise a spreading code to allow data signal to share a common bandwidth, for example. Typically, the chip rate of the code signal is greater than or chip rate of the data to obtain proper spreading.

The transmitter node 102 may comprise a signal conditioning module 112. In various embodiments, the signal conditioning module 112 may be arranged to receive and condition the baseband signal 110 (e.g., CDMA signal). For example, the signal condition module 112 may be arranged to receive the baseband signal 110 from the baseband processing module 108 and decrease signal amplitude PAR. In various implementations, conditioning the baseband signal 110 may decrease signal amplitude PAR without suffering extra spurious out-of-band emission. The signal conditioning module 112 may perform conditioning without clipping the baseband signal 110 such that the signal level may be bounded with less damage to signal integrity.

In various embodiments, the signal conditioning module 112 may split the baseband signal along multiple paths. As shown in FIG. 1, for example, the baseband signal 110 may be spit along a first path 114 and a second path 116. The baseband signal 110 may be provided along the first path 114 to a first gain control amplifier 118. In various embodiments, the first gain control amplifier 118 may provide a gain factor $\alpha$, where $0<\alpha<1$. In various implementations, values for the gain factor a may range between 0.5 and 0.9, for example. It can be appreciated that other values for the gain factor a may be employed for a given implementation.

Within the signal conditioning module 112, the baseband signal 110 may be provided along the second path 116 to a delay block 124. The delay block 124 may be arranged to delay the baseband signal 110 by a delay value $\delta$, where $\delta$ is greater than one chip time. In CDMA implementations, symbol time may be divided into chips where several chips form a symbol. Chip time may comprise the smallest baseband transmission time, for example, ⅓ dB frequency bandwidth of a signal. For a CDMA2000 signal or IS95 signal, the chip time may comprise 1.2288 Mcps (mega chips per second). In various embodiments, the delay value $\delta$ may be an integer multiple of a chip time, for example. The delay value $\delta$ may be generated by a clock running the transmission processes in the transmitter node 102, for example.

The delay block 124 may provide a delayed signal 126 to a second gain control amplifier 128. In various embodiments, the second gain control amplifier 128 may provide a gain factor $(1-\alpha)$. In various implementations, values for the gain factor $(1-\alpha)$ may range between 0.5 and 0.1, for example. It can be appreciated that other values of for the gain factor $(1-\alpha)$ may be employed for a given implementation.

The signal conditioning module 112 may comprise a combiner block 122 for receiving the outputs from the first gain amplifier 118 and the second gain amplifier 128. In various embodiments, the combiner block 122 may be arranged to combine a signal 120 having the gain factor $\alpha$ with a signal 130 delayed by $\delta$ and having the gain factor $(1-\alpha)$. In various implementations, the signal 120 and the signal 130 are combined to form a conditioned signal 132. The conditioned signal 132 may comprise a baseband signal having a lower PAR without suffering extra spurious out-of-band emission. The conditioned signal 132 may be generated without clipping the baseband signal 110 such that the signal level may be bounded with less damage to signal integrity.

In various embodiments, the baseband signal 110 may comprise a CDMA signal defined by s(t) in the time domain. Defining s(t)⇔S(f), the baseband signal 110 may be represented in the frequency domain by S(f) bounded to $f_{bw}$. The conditioned signal 132 may comprise a CDMA signal defined by x(t) in the time domain. In various embodiments, x(t)=αs(t)+(1−α)s(t−δ) where, 0<α<1, and δ>one chip time. Defining x(t)⇔X(f), it can be shown that:

$$X(f)=\alpha S(f)+(1-\alpha)S(f)e^{-j\omega_c\delta}.$$

As such, in various embodiments, the magnitude of the spectrum of x(t), |X(f)|, may be bounded as follows:

$$|X(f)|\leq \alpha|S(f)|+(1-\alpha)|S(f)\text{Exp}(-j\omega_c\delta)|=|S(f)|.$$

Therefore, in various implementations, the magnitude of the spectrum of x(t) may be bounded by that of s(t). As such no extra spurious emission other than that already bounded by the original intended signal s(t) will be released at the transmitter node 102. By conditioning the baseband signal in this manner, the signal quality is not compromised and signal integrity is maintained.

The transmitter node 102 may comprise a power amplifier 134 arranged to receive the conditioned signal 132. In various embodiments, the power amplifier 134 may be arranged to amplify the conditioned signal 132 for transmission by an antenna 136. The antenna 136 may comprise, for example, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In various implementations, the power amplifier 134 may convert the conditioned signal to RF band for transmission. In some embodiments, the transmitter node 102 may comprise a digital to D/A to convert a digital signal into an analog signal for transmission.

As shown in FIG. 1, the transmitter node 102 may transmit information over a communication channel 138. In various embodiments, the communication channel 138 may comprise one or more types of wireless communication media capable of carrying information such as portions of a wireless spectrum (e.g., the RF spectrum). In various implementations, the communication channel 138 may comprise one or more multi-carrier communication channels. A multi-carrier communication channel may comprise, for example, a wideband channel comprising multiple subchannels.

The system 100 may comprise a receiver node 140 for receiving information over the channel 138. In various embodiments, a signal received by an antenna 142 may be converted by a down conversion module 144 from RF to baseband signal, for example.

The receiver node 140 may comprise an equalization module 148 for receiving a down converted signal 146. In various embodiments, the equalization module 148 may be arranged to compensate for the delay intentionally introduced by the signal conditioning module 112 of the transmitter node 102. In various implementations, the equalization module 148 may equalize the intentional delay spread in a manner similar to that performed to compensate for naturally occurring (unintentional) delay caused by reflection from a building or other terrain, for example.

In various embodiments, the equalization module 148 may be implemented as a rake receiver. The rake receiver may be arranged to coherently combine the two paths of the conditioned signal 132 back together such that the same signal-to-noise ratio for detection will be achieved. In various implementations, combination and recovery by the rake receiver may be facilitated when the delay value δ is a multiple of a chip time and generated by a clock running the transmission process at the transmitter node 102. In various embodiments, the rake received may be provided with one or more additional fingers to further enhance signal recovery.

The receiver node 140 may comprise a demodulator module 152 to receive an equalized signal 150. In various embodiments, the demodulator module 152 may be arranged to employ various demodulation techniques (e.g., QAM, DQAM, BPSK, QPSK, OQPSK, DQPSK, FSK, MSK, GMSK). In various implementations, the demodulator module 162 may convert the equalized signal 150 to a serial data output flow.

Figure 2:
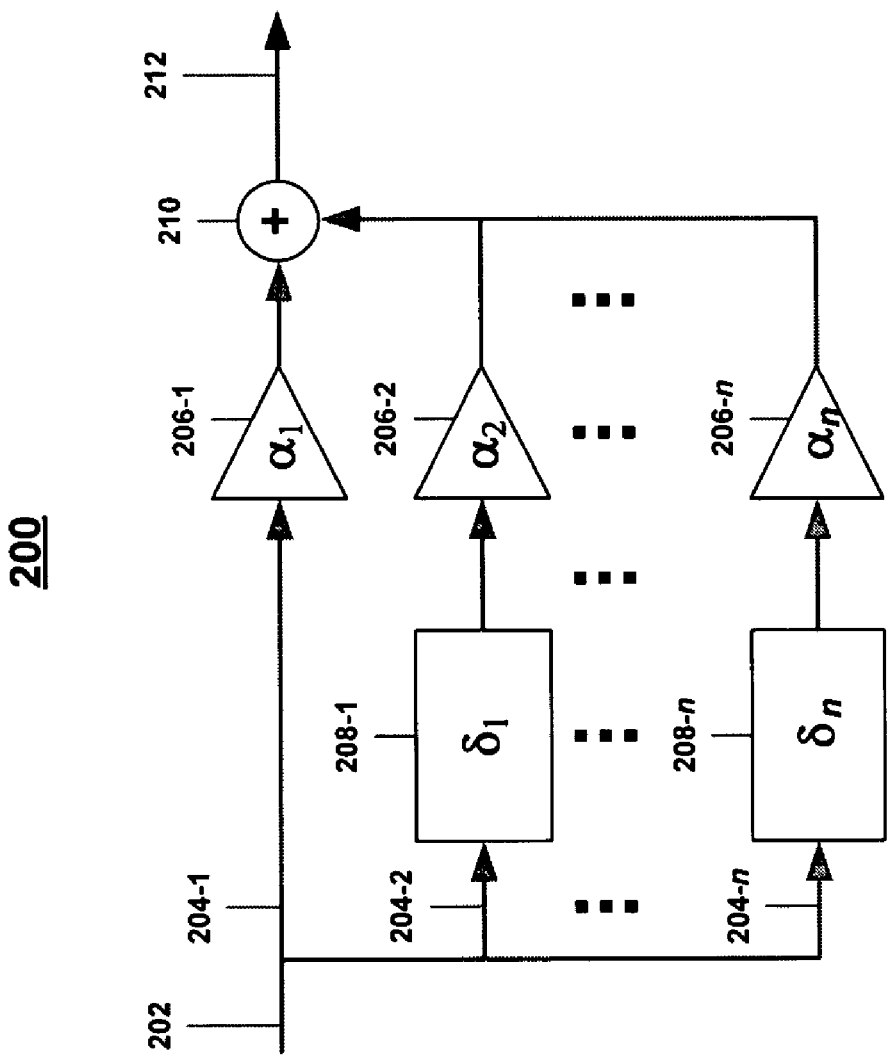
FIG. 2 illustrates a block diagram of a signal conditioning module in accordance with one embodiment.

FIG. 2 illustrates a block diagram of a signal conditioning module 200 in accordance with one embodiment. In various embodiments, the signal conditioning module 200 may be implemented in a communications system, such as communications system 100, for example. The embodiments are not limited in this context.

In various embodiments, the signal conditioning module 200 may split a baseband signal 202 (e.g., CDMA signal) along multiple paths 204-1-n, where n represents any positive integer value. The baseband signal 202 may be provided along the first path 204-1 to a first gain control amplifier 206-1. In various embodiments, the first gain control amplifier 118 may provide a gain factor $\alpha_1$, where 0<$\alpha_1$<1. It can be appreciated that various values for the gain factor $\alpha_1$ may be employed for a given implementation.

Within the signal conditioning module 200, the baseband signal 202 may be provided along paths 204-2-n to a delay blocks 208-1-n. The delay blocks 208-1-n may be arranged to delay the baseband signal 202 by delay values $\delta_1, \ldots, \delta_n$, where $\delta_1, \ldots, \delta_n$ may be equal or unequal values greater than one chip time. In various embodiments, each of the delay values $\delta_1, \ldots, \delta_n$ may be an integer multiple of a chip time, for example. The delay values $\delta_1, \ldots \delta_n$ may be generated by a clock running transmission processes, for example.

The delay blocks 208-1-n may provide delayed signals to gain control amplifiers 206-2-n. In various embodiments, the gain control amplifiers 206-2-n may provide gain factors $\alpha_2, \ldots, \alpha_n$, where $\alpha_1+\alpha_2+ \ldots +\alpha_n=1$. It can be appreciated that various values for the gain factors $\alpha_1, \ldots, \alpha_n$ may be employed for a given implementation.

The signal conditioning module 200 may comprise a combiner block 210 for receiving the outputs from the gain amplifiers 206-1-n. In various embodiments, the combiner block 210 may be arranged to combine a signal having the gain factor $\alpha_1$ with signals delayed by delay values $\delta_1, \ldots, \delta_n$ and having gain factors $\alpha_2, \ldots, \alpha_n$.

In various implementations, the combined signals form a conditioned signal 212. The conditioned signal 212 may comprise a baseband signal (e.g., CDMA signal) having a decreased signal amplitude PAR without suffering extra spurious out-of-band emission. The conditioned signal 212 may be generated without clipping the baseband signal 202 such that the signal level may be bounded with less damage to signal integrity.

Operations for various embodiments may be further described with reference to the following figures and accompanying examples. Some of the figures may include a process and/or logic flow. It can be appreciated that an illustrated process and/or logic flow merely provides one example of how the described functionality may be implemented. Further, a given process and/or logic flow does not necessarily have to be executed in the order presented unless otherwise indicated. In addition, a process and/or logic flow may be implemented by a hardware element, a software element executed by a processor, or any combination thereof. The embodiments are not limited in this context.

Figure 3:
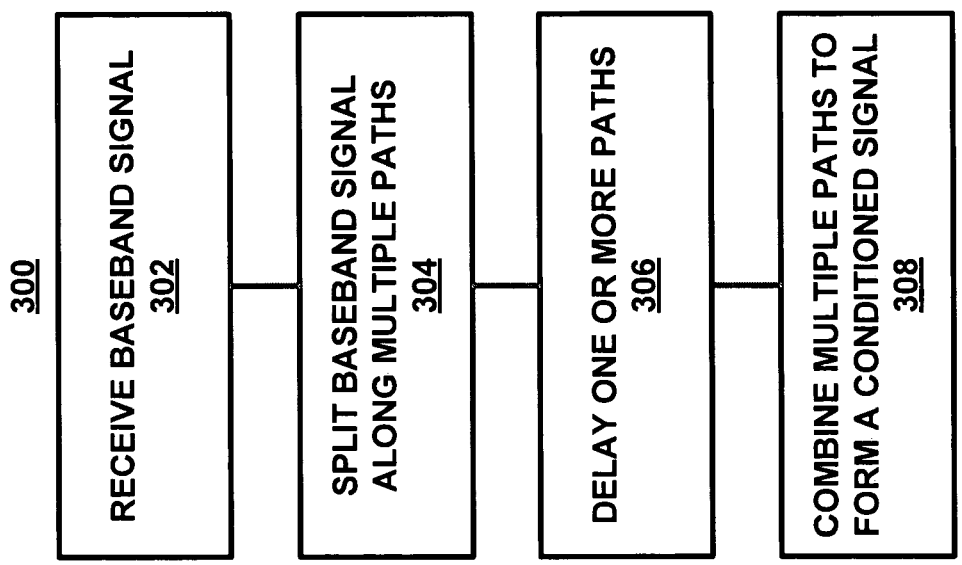
FIG. 3 illustrates a logic flow directed to conditioning a signal to reduce signal amplitude PAR in accordance with one embodiment.

FIG. 3 illustrates a logic flow 300 directed to conditioning a signal to reduce signal amplitude PAR in accordance with one embodiment. In various embodiments, the logic flow 300 may comprise receiving a baseband signal (block 302), splitting the baseband signal into multiple paths (block 304), delaying one or more paths (block 306), and combining the multiple paths to form a conditioned signal (block 308).

In various implementations, the conditioned signal may comprise a baseband signal (e.g., CDMA signal) having a decreased signal amplitude PAR without suffering extra spurious out-of-band emission. The conditioned signal may be generated without clipping the baseband signal such that the signal level may be bounded with less damage to signal integrity.

In various embodiments, the logic flow 300 may be performed by a communications system (e.g. communications system 100), a node (e.g., transmitter node 102) and/or a module (e.g., signal conditioning module 112, signal conditioning module 200), for example. It is to be understood that the logic flow 300 may be implemented by various other types of hardware, software, and/or combination thereof.

In various implementations, the described embodiments may decrease signal amplitude PAR. As a result, a wireless communications system may improve performance when signal conditioning is required at the PA stage, for example. Decreased PAR may be demonstrated, for example, by comparing the spectral contents of a signal with clipping to that of a conditioned signal.

As described above, a baseband signal may comprise a CDMA signal defined by s(t) in the time domain. Defining $s(t) \Leftrightarrow S(f)$, the baseband signal may be represented in the frequency domain by S(f) bounded to $f_{bw}$. The conditioned signal may comprise a CDMA signal defined by x(t) in the time domain, where $x(t)=\alpha s(t)+(1-\alpha)s(t-\delta)$, $0<\alpha<1$, and $\delta>$one chip time, for example.

Clipping achieves higher PA efficiency at the expense of spurious out-of-band emissions. The spurious emissions are a fundamental effect which may be described by defining a clipped signal u(t) as $u(t)=s(t) \cdot c(t)$, where c(t) is the clipping function. In the time domain, the clipping function c(t) may comprise a generally rectangular waveform having mostly the value of 1 during the time when the signal is not clipped and dropping sharply to a value between 0 and less that one during the time the signal is clipped. The value that c(t) drops to from 1 typically depends on what fraction of the signal value was allowed to pass to meet the maximum signal level. As such, c(t) will have a generally rectangular pulse shape mostly at value of 1 with random drops to lower values between 0 and 1, for example. A frequency representation of this signal C(f) typically will have Sinc-like characteristics in the frequency domain. Sinc functions have side lobes on both sides of a main lobe in a frequency representation.

The clipped signal u(t) may be represented in the frequency domain by U(f), where $U(f)=S(f)*C(f)$, and where "*" denotes the convolution operator. Due to the side lobes present in C(f) beyond the main lobe (theoretically to infinite) and the convolution operation, U(f) will have energy present at frequencies where C(f) is non-zero and that will include out of the frequency bandwidth of S(f) where C(f) was non-zero.

By comparing the spectral contents of the clipped signal u(t) to that of a conditioned signal x(t), decreased PAR may be demonstrated. In such comparisons, both signals are clipping at the same envelope level. For instance, 10% clipping may refer to 10% clipping of u(t) and however much clipping that would correspond exactly to the same signal level of x(t). Comparisons may be made using different values of α and δ at several clipping factors to demonstrate a considerable reduction in PAR.

Figure 4:
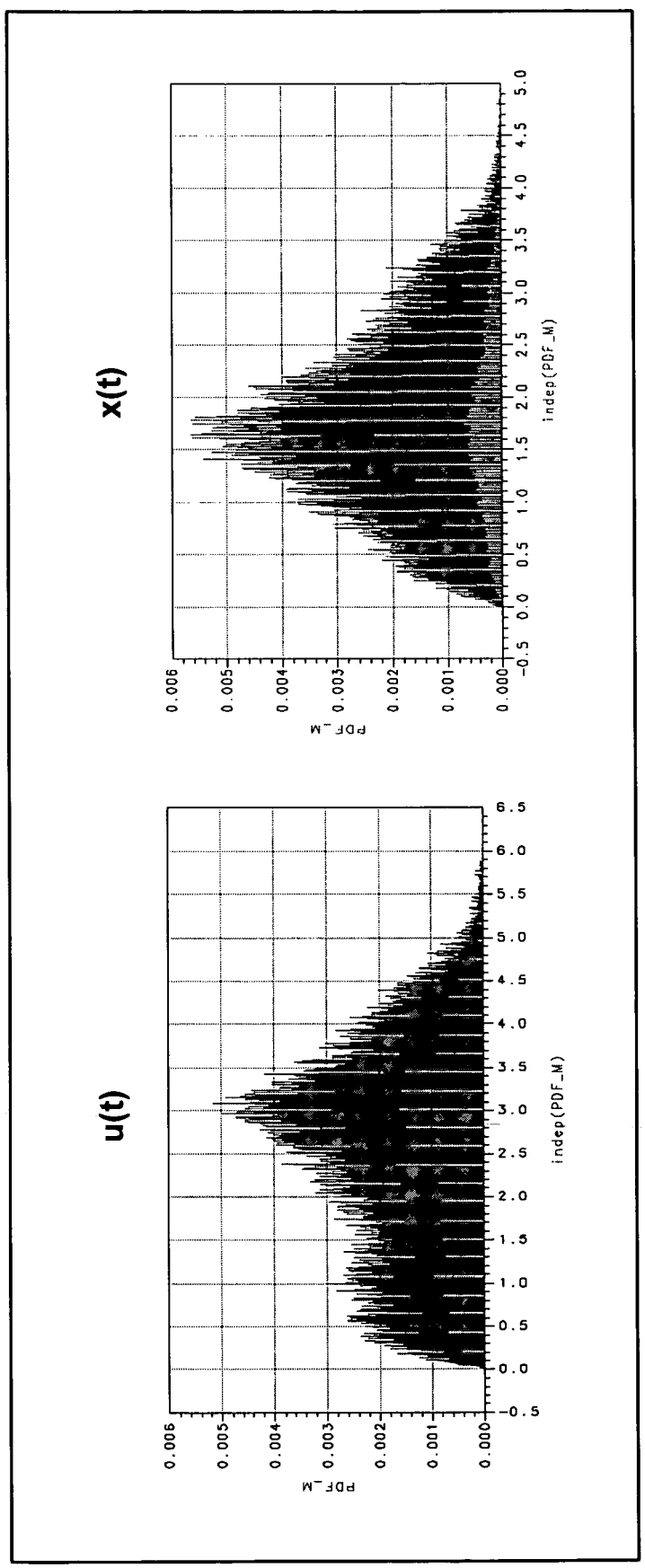
FIG. 4 illustrates an envelope distribution in accordance with one embodiment.

FIG. 4 illustrates an envelope distribution in accordance with one embodiment. FIG. 4 illustrates envelope distribution of a clipped signal u(t) and a conditioned signal x(t) at 1% clipping with δ=10 chips and α=0.5. As shown, the clipped signal u(t) on the left shows more variability around the mean compared to x(t) on the right. As compared to the clipped signal u(t), the conditioned signal u(t) demonstrates less variability and improved PAR.

Figure 5:
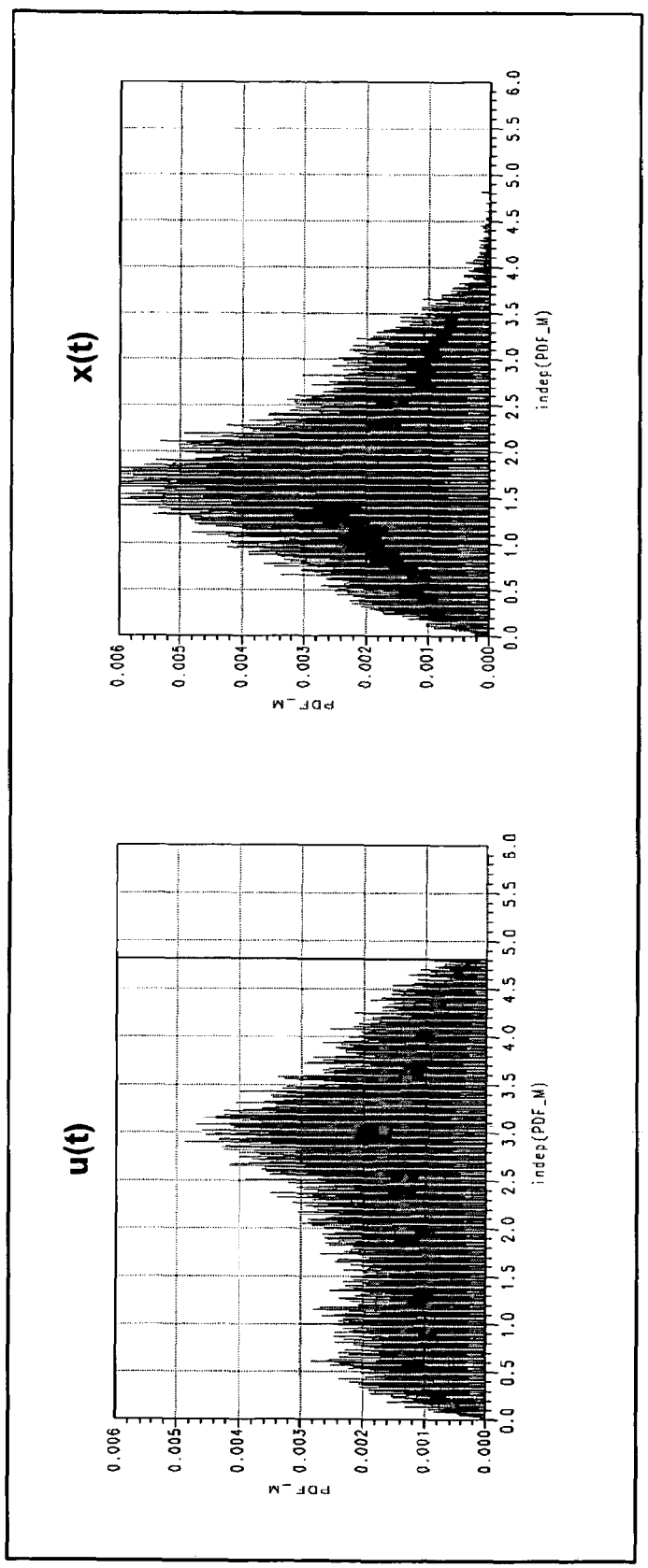
FIG. 5 illustrates an envelope distribution in accordance with one embodiment.

FIG. 5 illustrates an envelope distribution in accordance with one embodiment. FIG. 5 illustrates envelope distribution of a clipped signal u(t) and a conditioned signal x(t) at 10% clipping with δ=10 chips and α=0.5. As shown, clipping affects u(t) before it affects x(t). When clipped at the same level, the conditioned signal x(t) demonstrates better ACPR performance as compared to the clipped signal u(t).

Figure 6:
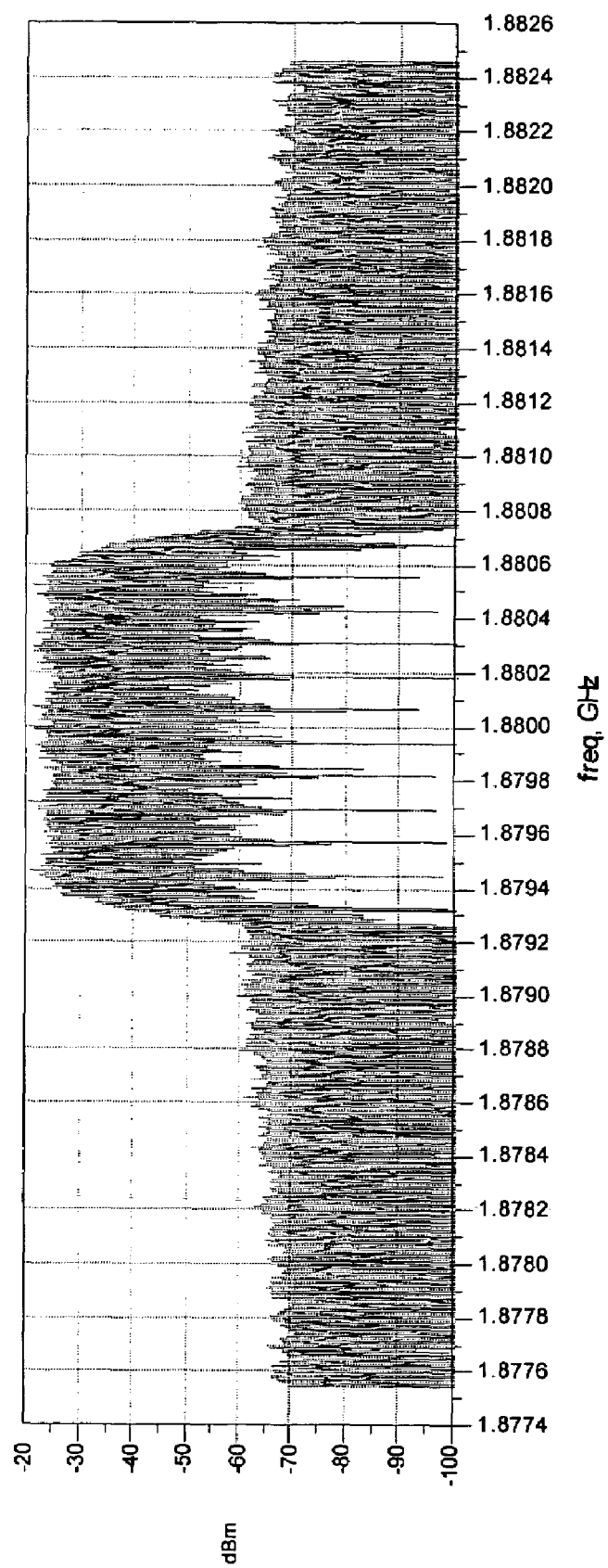
FIG. 6 illustrates a spectrum magnitude in accordance with one embodiment.

FIG. 6 illustrates a spectrum magnitude in accordance with one embodiment. FIG. 6 illustrates spectrum magnitude of a clipped signal u(t) and a conditioned signal x(t) at 10% clipping with δ=10 chips and α=0.5. The lighter spectrum corresponds to the clipped signal u(t) and the darker spectrum corresponds to the conditioned signal x(t). As shown, the conditioned signal x(t) demonstrates better out-of-band spurious emission characteristics than the clipped signal u(t).

Figure 7:
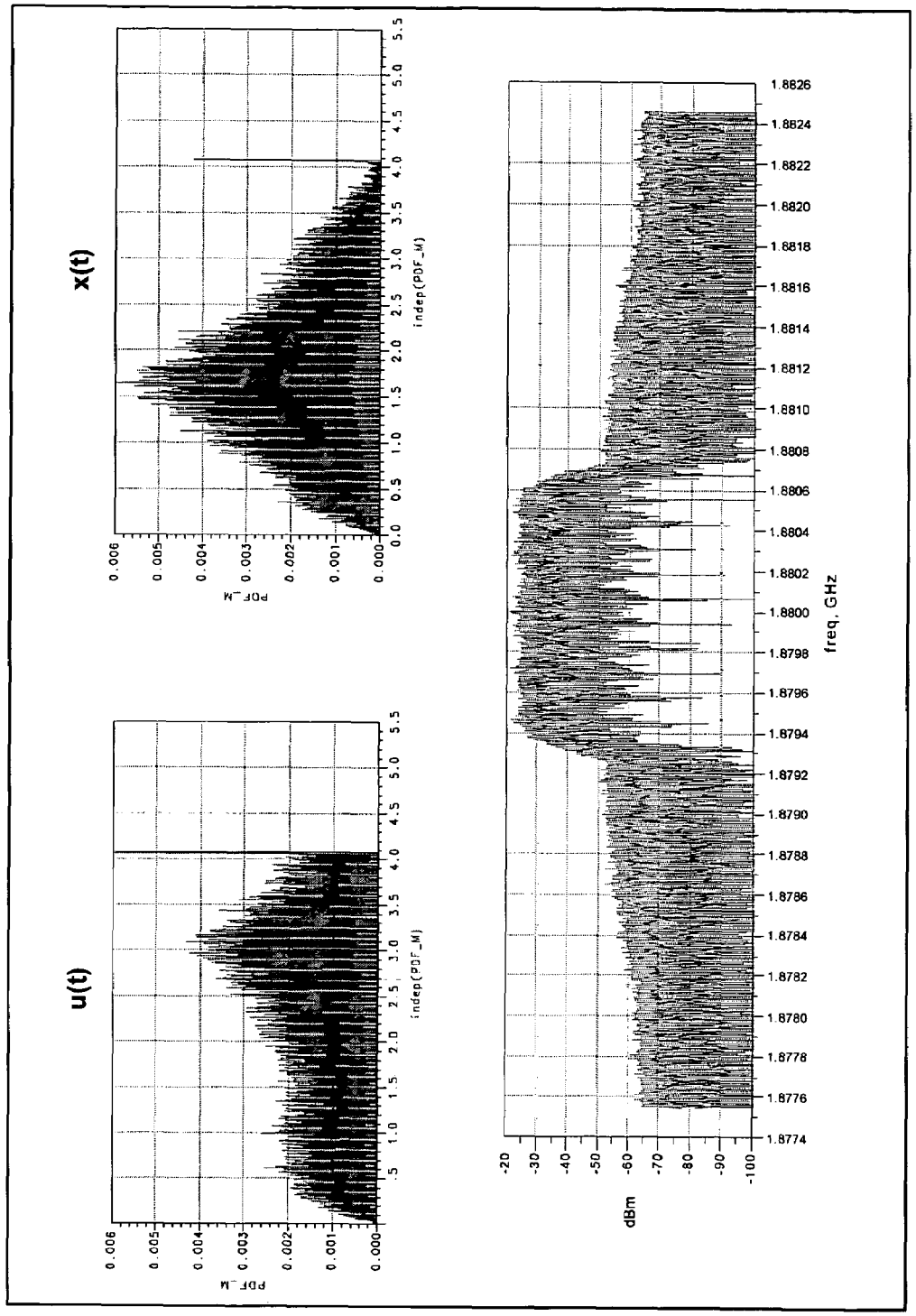
FIG. 7 illustrates an envelope distribution and a spectrum magnitude in accordance with one embodiment.

FIG. 7 illustrates an envelope distribution and a spectrum magnitude in accordance with one embodiment. FIG. 7 illustrates envelope distribution of a clipped signal u(t) and a conditioned signal x(t) at 20% clipping with δ=10 chips and α=0.5. As shown, further improvement is evident at 20% clipping. As compared to the clipped signal u(t), the conditioned signal x(t) demonstrates less variability, improved PAR, better ACPR performance, and better out-of-band spurious emission characteristics.

Table 1 illustrates 20% clipping at various chip delays. Sensitivity of the results may be measured for variations in the delay factor δ. As shown, similar results such as Adjacent Channel Power Ratio (ACPR) levels may be achieved for various values of delay (e.g., 1 to 25 chips). This similarity in results is expected since once the two signal paths are delayed beyond one chip, the two signal paths stay orthogonal to the extent that the DS code provides.

TABLE 1

| DELAY | ACPR_Low (dBc) | ADJACENT POWER (dBm) | CENTER POWER (dBm) | ACPR_High (dBc) |
|---|---|---|---|---|
| 1 chip | 58.980 | −49.108 | 9.872 | 58.905 |
| 5 chips | 54.195 | −44.155 | 10.040 | 54.507 |
| 10 chips | 57.342 | −47.553 | 9.789 | 57.135 |
| 15 chips | 56.833 | −47.018 | 9.815 | 56.499 |
| 20 chips | 55.997 | −46.171 | 9.826 | 55.883 |
| 25 chips | 56.542 | −46.694 | 9.848 | 56.139 |

Figure 8:
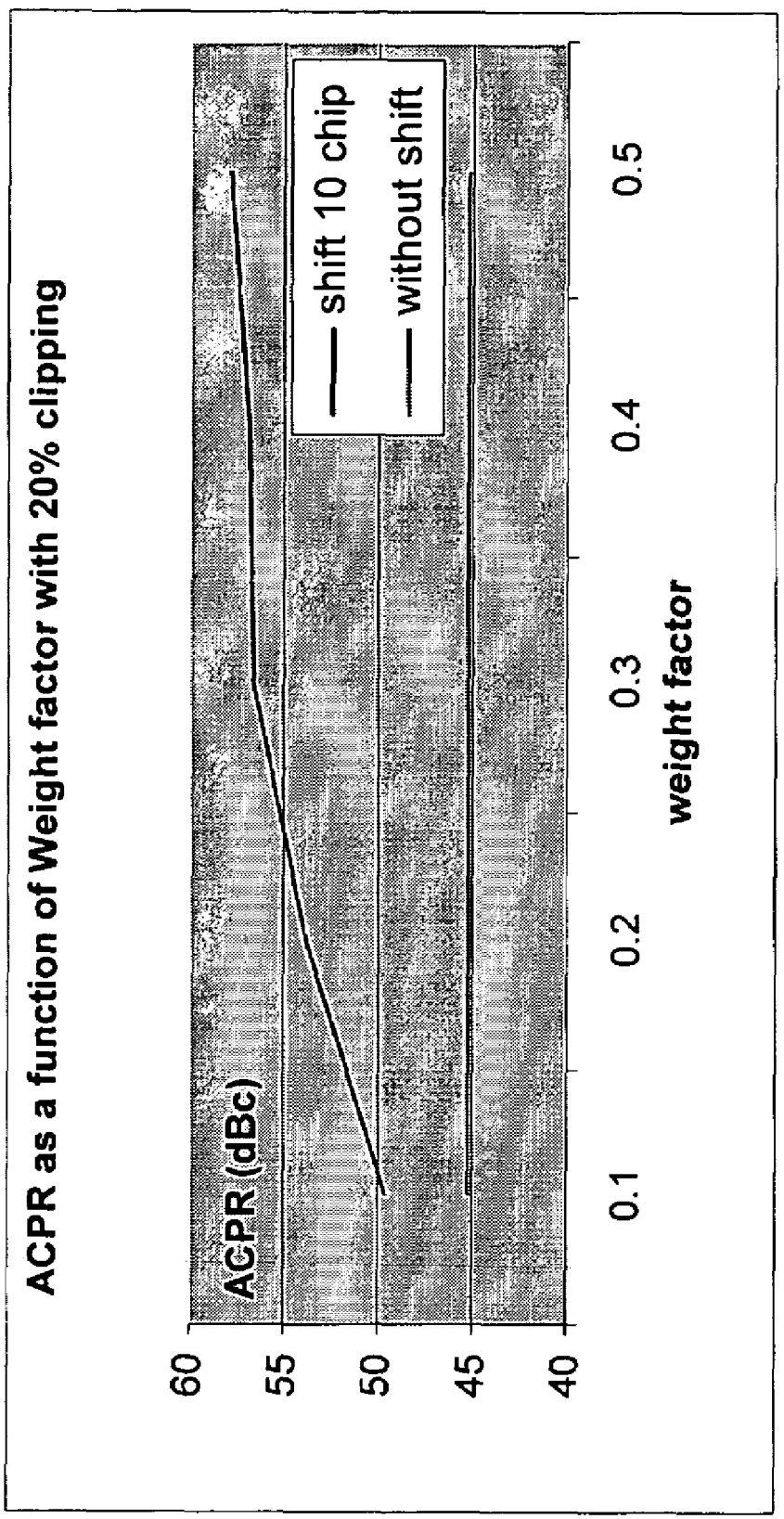
FIG. 8 illustrates a chart showing the effect of a on performance result using various gain factor values in accordance with one embodiment.

FIG. 8 illustrates a chart showing the effect of α on performance result using various gain factor values in accordance with one embodiment. FIG. 8 illustrates a chart showing the effect of α on performance result by using various values of the gain factor (1−α) at 20% clipping with δ=10 chips. As shown, a delay of only 10% of the signal achieves close to 5 dB of performance gain in terms of ACPR, which is considerable. It is also noted that beyond 1−α=0.3, there is not much extra gain to be achieved. As such, it may be unnecessary to have delay path gains beyond a limit. In various implementations, the limit may be a function of the desired clipping factor, for example, 1−α=0.3 for 20% clipping.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the communications system 100 may be illustrated using a particular communications media by way of example, it may be appreciated that the principles and techniques discussed herein may be implemented using any type of communication media and accompanying technology. For example, the communications system 100 may be implemented as a wired communication system, a wireless communication system, or a combination of both. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, PLD, DSP, and so forth. In yet another example, an embodiment may be implemented by any combination of programmed general-purpose computer components and custom hardware components.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
   a signal conditioning module to receive a baseband signal, said signal conditioning module comprising:
   multiple parallel paths for splitting said baseband signal, the multiple parallel paths comprise n paths having gain factors $\alpha_1, \ldots, \alpha_n$, where $\alpha_1 + \alpha_2 + \ldots + \alpha_n = 1$ and n comprises a positive integer value, the multiple parallel paths comprising a first path wherein the baseband signal is provided directly to an amplifier;
   a delay block for delaying each of the subsequent multiple parallel paths; and
   a combiner block to combine said multiple parallel paths to form a conditioned signal having a lower signal amplitude peak-to-average ratio than said baseband signal.

2. The apparatus of claim 1, wherein said baseband signal comprises a code division multiple access signal.

3. The apparatus of claim 1, wherein said multiple parallel paths comprise the first path having a gain factor α and a second path having a gain factor (1-α).

4. The apparatus of claim 1, wherein said delay block comprises a delay value greater than one chip time.

5. The apparatus of claim 1, wherein said conditioning module provides said conditioned signal to a power amplifier module.

6. The apparatus of claim 1, wherein said conditioned signal comprises less spurious out-of-band emissions than a clipped signal.

7. A system, comprising:
   an antenna; and
   a transmitter node to couple to said antenna, said transmitter node comprising:
   a signal conditioning module to receive a baseband signal, said signal conditioning module comprising:
   multiple parallel paths for splitting said baseband signal, the multiple parallel paths comprise n paths having gain factors $\alpha_1, \ldots, \alpha_n$, where $\alpha_1 + \alpha_2 + \ldots + \alpha_n = 1$ and n comprises a positive integer value, the multiple parallel paths comprising a first path wherein the baseband signal is provided directly to an amplifier;
   a delay block for delaying each of the subsequent multiple parallel paths; and
   a combiner block to combine said multiple parallel paths to form a conditioned signal having a lower signal amplitude peak-to-average ratio than said baseband signal.

8. The system of claim 7, wherein said baseband signal comprises a code division multiple access signal.

9. The system of claim 7, wherein said multiple parallel paths comprise the first path having a gain factor $\alpha$ and a second path having a gain factor $(1-\alpha)$.

10. The system of claim 7, wherein said delay block comprises a delay factor greater than one chip time.

11. The system of claim 7, wherein said signal conditioning module provides said conditioned signal to a power amplifier module.

12. The system of claim 7, wherein said conditioned signal comprises less spurious out-of-band emissions than a clipped signal.

13. The system of claim 7, wherein said transmitter node transits said conditioned signal to a receiver node.

14. The system of claim 13, wherein said receiver node comprises an equalization module for recovering said baseband signal.

15. The system of claim 13, wherein said receiver node comprises a rake receiver.

16. A method, comprising:

receiving a baseband signal at a signal conditioning module;

splitting said baseband signal along multiple parallel paths, the multiple parallel paths comprise n paths having gain factors $\alpha_1, \ldots, \alpha_n$, where $\alpha_1 + \alpha_2 + \ldots + \alpha_n = 1$ and n comprises a positive integer value;

providing said baseband signal along a first path directly to an amplifier;

delaying each of the subsequent multiple parallel paths; and combining said multiple parallel paths to form a conditioned signal having a lower signal amplitude peak-to-average ratio than said baseband signal.

17. The method of claim 16, wherein said baseband signal comprises a code division multiple access signal.

18. The method of claim 16, wherein said multiple parallel paths comprise the first path having a gain factor $\alpha$ and the second path having a gain factor $(1-\alpha)$.

19. The method of claim 16, wherein delaying comprises more than one chip time.

20. The method of claim 16, further comprising providing said conditioned signal to a power amplifier module.

21. The method of claim 16, wherein said conditioned signal comprises less spurious out-of-band emissions than a clipped signal.

22. The method of claim 16, further comprising transmitting said conditioned signal to a receiver.

* * * * *